United States Patent [19]

Okada et al.

[11] 3,879,576

[45] Apr. 22, 1975

[54] SYNCHRONIZING SIGNAL SEPARATING CIRCUIT

[75] Inventors: Takashi Okada, Yamato-shi, Kanagawa-ken; Hirouyki Sumiya, Tanashi-shi, Tokyo; Tomoyoshi Imayasu, Yokosuka-shi, Kanagawa-ken, all of Japan

[73] Assignee: Sony Corporation, Tokyo, Japan

[22] Filed: Apr. 2, 1973

[21] Appl. No.: 346,779

[30] Foreign Application Priority Data

Apr. 5, 1972 Japan .............................. 47-34160
May 31, 1972 Japan .............................. 47-54077

[52] U.S. Cl. ........... 178/7.3 S; 307/235 R; 328/139
[51] Int. Cl. ........................ H04n 5/08; H03b 1/00
[58] Field of Search ...................... 178/7.3 S, 7.5 S; 307/235 R, 235 A; 328/139

[56] References Cited

UNITED STATES PATENTS 3,201,680 8/1965 Ross et al. ......................... 307/235
3,532,811 10/1970 Dann ............................... 178/7.3 S
3,740,470 6/1973 Rhee ............................... 178/7.3 S
3,746,786 7/1973 Nomoto et al. .................... 178/7.3 S

FOREIGN PATENTS OR APPLICATIONS 1,116,362 6/1968 United Kingdom ............. 178/7.3 S

*Primary Examiner*—Benedict V. Safourek
*Assistant Examiner*—George G. Stellar
*Attorney, Agent, or Firm*—Lewis H. Eslinger; Alvin Sinderbrand

[57] ABSTRACT

In a synchronizing signal separating circuit comprising an amplifier circuit receiving a composite signal, for example, a video signal, and a self-biasing circuit that includes a capacitor which is charged during each synchronizing signal period of the composite signal and then discharged during the subsequent information signal period; a constant current circuit is provided for discharging of the capacitor so that the separated synchronizing signals obtained as the output of the amplifier circuit will have a uniform pulse width irrespective of the amplitudes of the intervening information signals.

5 Claims, 13 Drawing Figures

SYNCHRONIZING SIGNAL SEPARATING CIRCUIT

This invention relates generally to a synchronizing signal separating circuit, and more particularly is directed to an improved synchronizing signal separating circuit by which horizontal synchronizing signals of uniform pulse width can be separated from a composite video or television signal irrespective of the average voltage or amplitude of the video information signals interposed between the synchronizing signals.

In a conventional horizontal synchronizing signal separating circuit, the composite video signal is supplied to a transistor included in an amplifier circuit by way of a self-biasing circuit that includes a capacitor so that, during the period of each horizontal synchronizing signal, the capacitor is charged and the transistor is made conductive to provide a corresponding separated horizontal synchronizing pulse at the output of the amplifier circuit, and during the period of the subsequent video information signal, the capacitor is discharged by a current passing through a resistor and the transistor is made non-conductive. With the foregoing horizontal synchronizing signal separating circuit, the resulting synchronizing signal pulses are frequently pulse-width-modulated in accordance with the amplitude or average voltage of the video information signals interposed between the synchronizing signals.

Accordingly, it is an object of this invention to provide an improved circuit for separating synchronizing signals from a composite signal which further includes information signals interposed between the successive synchronizing signals, and by which the resulting synchronizing signal pulses are of uniform pulse width irrespective of the amplitudes of the intervening information signals.

Another object is to provide a synchronizing signal separating circuit, as aforesaid, which is particularly suited for the separation of horizontal synchronizing signals from a composite video or television signal.

Still another object is to provide a horizontal synchronizing signal separating circuit, as aforesaid, which can be conveniently produced as an integrated circuit particularly for use in television receivers and the like.

In accordance with an aspect of this invention, a circuit for separating synchronizing signals from a composite signal, for example, a composite television or video signal, comprises an amplifying circuit preferably including at least one transistor, a self-biasing circuit for applying a self-bias to the amplifying circuit in response to the composite signal so that the amplifying circuit provides separated synchronizing signal pulses, as the output therefrom, in correspondence with the synchronizing signals in the received composite signal, and a constant current circuit connected with the self-biasing circuit for maintaining the self-bias at a substantially constant value at the conclusion of each of the information signals irrespective of the amplitude or average voltage of the latter.

In a preferred embodiment of the invention, the self-biasing circuit includes a capacitor which is charged during the period of each synchronizing signal and discharged by means of the constant current circuit during the period of a subsequent information signal.

The above, and other objects, features and advantages of this invention, will be apparent in the following detailed description of illustrative embodiments thereof which is to be read in connection with the accompanying drawings, wherein.

Figure 1:
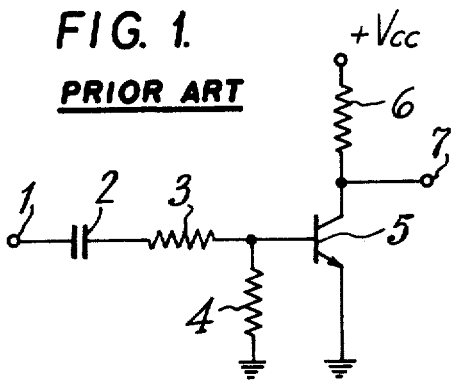
FIG. 1 is a circuit diagram showing a conventional synchronizing signal separating circuit.
Figures 3A, 3B, 3C:
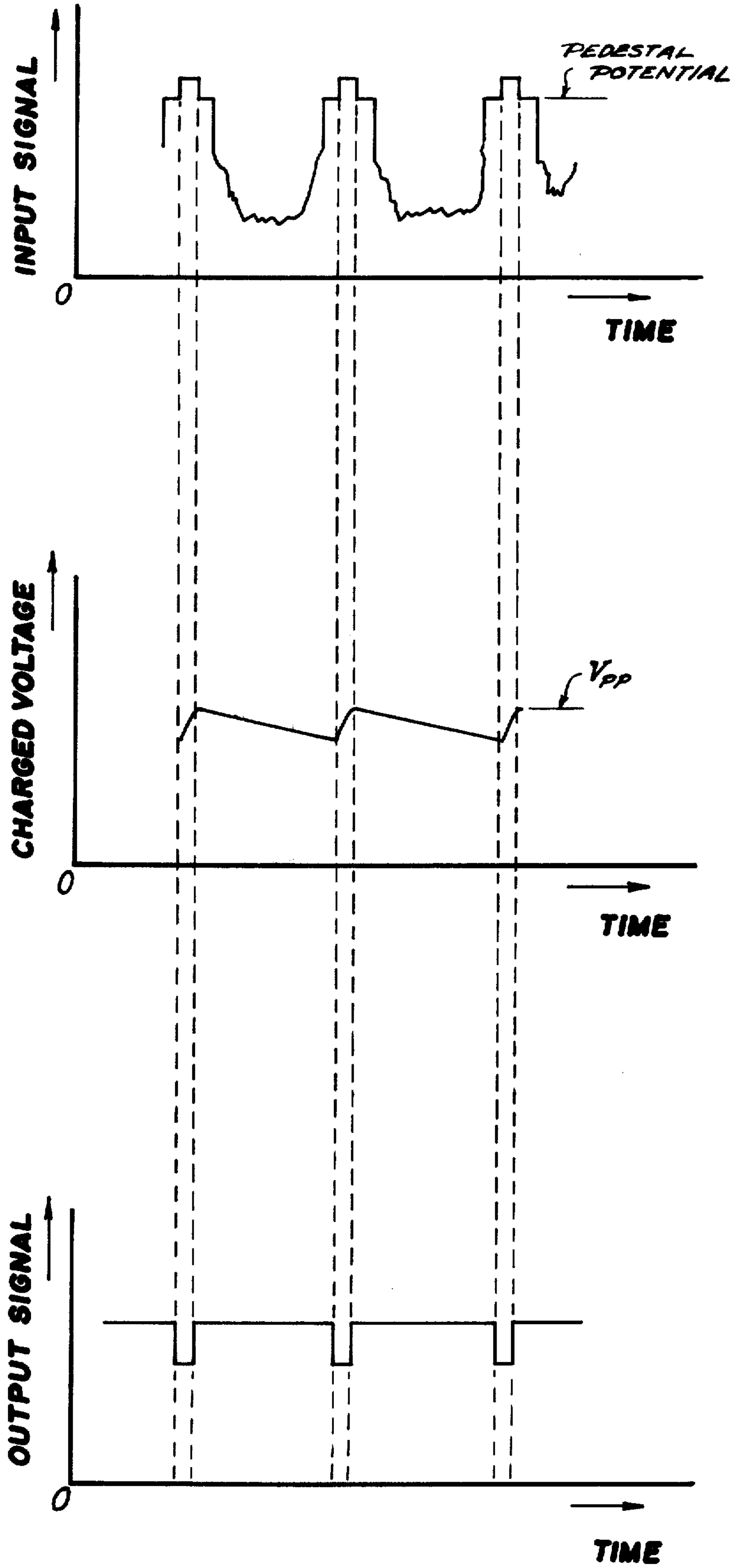
FIGS. 3A, 3B and 3C are waveform diagrams to which reference will be made in explaining the operation of the circuit illustrated in FIG. 2.

Referring to the drawings in detail, and initially to FIG. 1 thereof, it will be seen that, in the conventional synchronizing signal separating circuit there illustrated, a composite television or video signal, for example, as represented on FIG. 3A, is supplied to an input terminal 1 which is connected through a capacitor 2 and resistor 3 to the base of a transistor 5. The base of transistor 5 is further connected through a resistor 4 to a reference potential, for example, ground, to which the emitter of transistor 5 is also connected. A voltage supply source $+V_{cc}$ is connected through a load resistor 6 to the collector of transistor 5 which is also connected to an output terminal 7.

In the foregoing conventional synchronizing signal separating circuit, transistor 5 forms an amplifier circuit, while capacitor 2 and resistors 3 and 4 constitute a self-biasing circuit therefor. When the composite video signal, which is shown on FIG. 3 to have horizontal synchronizing signals of positive polarity, is supplied to input terminal 1, a charging current for capacitor 2 flows through resistors 3 and 4 and through the base-emitter junction of transistor 5 during the period of each horizontal synchronizing signal. When the charging current flowing through resistor 4 produces a sufficient voltage drop thereacross, transistor 5 is rendered conductive with the result that a corresponding synchronizing signal pulse, in this case of negative polarity, is obtained at output terminal 7. During the period of the following video or other information signal which, in the case being described, has a negative polarity in respect of the charged voltage of capacitor 2, the electric charge previously stored on capacitor 2 is discharged by a current flowing through resistors 3 and 4 due to the difference between the amplitude or average DC voltage of the video information signal and the charged voltage of the capacitor. It will be apparent that such discharging current will be influenced by the amplitude or average voltage of the video information signal. Thus, if the difference between the charged voltage of capacitor 2 and the average voltage of the video information signal is increased, the discharging current is similarly increased to thereby decrease the amount of the original electrical charge remaining one capacitor 2 at the end of the video information signal period. Conversely, if the difference between the charged voltage of capacitor 2 and the average voltage of the video information signal is reduced, the discharging current is similarly reduced so that, at the end of the video information signal period, a relatively larger porportion of the original charge remains on capacitor 2.

In other words, the state or condition of capacitor 2 at the commencement of each synchronizing signal in the composite signal will be influenced by the amplitude or average voltage of the preceding video information signal. It will be understood that the electrical charge remaining on capacitor 2 at the end of a video information signal period will determine the amplitude of the charging current that flows through resistors 3 and 4 at the commencement of the next synchronizing signal period. If the difference between the charged voltage of capacitor 2 at the completion of a synchronizing signal period and the average voltage of the next video information signal is sufficiently large, the resulting discharging of the capacitor during the video information signal period can result in the resumption of the charging of capacitor 2 and a charging current through resistors 3 and 4 that is sufficiently large to make transistor 5 conductive during the concluding portion of the video information signal period, that is, prior to the next synchronizing signal period itself. Thus, the synchronizing clipping level may be lowered into the video information signal portion of the composite video signal. As a result, the pulse width of the next synchronizing signal pulse obtained at output terminal 7 will be greater than a predetermined width. From the foregoing, it will be seen that, with the conventional synchronizing signal separating circuit described with reference to FIG. 1, the resultant synchronizing signal pulses obtained at output 7 are frequently pulse-width-modulated in accordance with the amplitude or average voltages of the video information signals.

Figure 2:
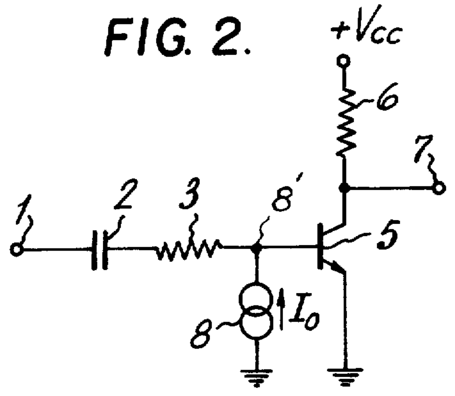
FIG. 2 is a circuit diagram showing a synchronizing signal separating circuit according to one embodiment of the present invention.

Referring now to FIG. 2 in which the various circuit components corresponding to those included in the circuit of FIG. 1 are identified by the same reference numerals, it will be seen that, in a synchronizing signal separating circuit according to this invention as there illustrated, the self-biasing circuit for the amplifier circuit, which self-biasing circuit includes the capacitor 2 and resistor 3, has a constant current circuit 8 connected therewith. In other words, in the embodiment of the invention illustrated on FIG. 2, the conventional synchronizing signal separating circuit of FIG. 1 has its resistor 4 replaced by the constant current circuit 8. In the case where the composite signal supplied to input terminal 1 contains synchronizing signals of positive polarity, for example, as shown on FIG. 3A, the constant current circuit 8 is arranged so that the constant current flow $I_o$ therethrough is in the direction toward the connection point or junction 8' between resistor 3 and transistor 5. The constant current circuit 8 for obtaining constant current flow in the indicated direction may have various conventional configurations, for example, as on FIG. 6D, in which the constant current circuit 8 is shown to include a PNP-transistor $8_1$ having its emitter connected to the voltage supply source $+V_{cc}$ and its collector connected to the connection point 8', and a Zener diode $8_2$ for establishing a constant bias voltage for the transistor $8_1$. A further example of a constant current circuit that can be employed in the embodiment of the invention illustrated by FIG. 2 is generally identified at $8_a$ on FIG. 6E and there shown to include the transistor $8_1$ and an additional PNP-transistor $8_3$ connected so as to establish a constant bias voltage for the transistor $8_1$.

When the composite video signal shown on FIG. 3A is supplied to the input terminal 1 of the synchronizing signal separating circuit illustrated on FIG. 2, the charging voltage of capacitor 2 rises to the pedestal potential of the composite signal by the self-biasing effect of the capacitor, which charging voltage may correspond to the synchronizing signal clipping level. During the period of a synchronizing signal having a higher potential than the previously mentioned clipping level, the charging current for the capacitor 2 further flows through resistor 3 and transistor 5 which is made conductive and the capacitor 2 is charged up to the peak potential $V_{pp}$ of the synchronizing signal, as shown on FIG. 3B. Thus, transistor 5 is made conductive during the period of the synchronizing signal, and a corresponding synchronizing signal pulse is obtained at the output terminal 7, as shown on FIG. 3C. At the conclusion of the sychronizing signal period, transistor 5 is returned to its non-conductive state, and the electrical charge stored on capacitor 2 is gradually discharged at a substantially constant rate by means of the constant current circuit 8 irrespective of the average voltage of the video information signal that is then occurring. The total discharge Q of capacitor 2 in the period between successive synchronizing signals is given by the following equation:

$$Q = \int_0^t I_o dt = I_o \cdot T$$

in which $I_o$ is the constant current through constant current circuit 8, and $T$ is the time between successive synchronizing signals.

Therefore, the voltage drop $\Delta V_c$ of the capacitor 2 during each video information signal may be expressed as follows:

$$\Delta V_c = Q/C = I_o T/C$$

in which $C$ is the capacitance of capacitor 2.

It will be apparent from the above that, by suitably controlling the constant current $I_o$ of the constant current circuit 8, the voltage drop $\Delta V_c$ can be made equal to the increase in the voltage or charge on the capacitor 2 occurring during each synchronizing signal period, as shown on FIG. 3B. Therefore, the synchronizing signal clipping level is maintained constant irrespective of changes occurring in the average voltage of the successive video information signals and, as a result thereof, the synchronizing signal pulses obtained at output 7 are of uniform pulse-width, rather than being modulated by the video information signals as in the previously described conventional circuit.

Figure 4:
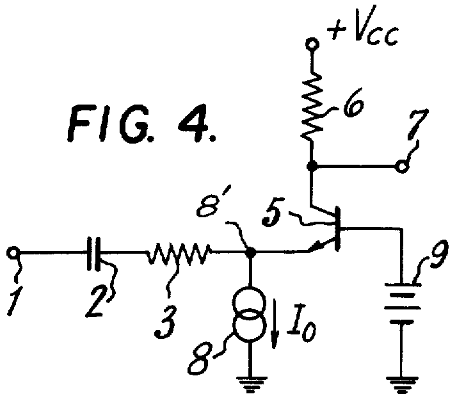
FIGS. 4 and 5 are circuit diagrams respectively illustrating additional embodiments of the present invention.

Referring now to FIG. 4, in which the various components of a synchronizing signal separating circuit according to another embodiment of this invention are identified by the same reference numerals as the corresponding components in the circuit of FIG. 2, it is to be noted that the transistor 5 in the circuit shown on FIG. 4 has a C-class switching action so as to provide such circuit with a power efficiency higher than that of the circuit of FIG. 2. In order to achieve such switching action of the transistor 5 on FIG. 4, a potential source 9, which determines the synchronizing signal clipping level, is connected to the base of transistor 5, and the input composite signal is supplied to the emitter of the transistor 5 through the self-biasing circuit constituted by capacitor 2 and resistor 3. Further, in the circuit of FIG. 4, the constant current circuit 8 is connected to the emitter of transistor 5 and arranged so that the constant current flow through circuit 8 is in the direction away from the junction 8' between resistor 3 and transistor 5. The circuit of FIG. 4 is intended to be employed for separating synchronizing signals from a composite signal in which the synchronizing signals have a negative polarity as compared with the intervening video information signals.

Figure 6A:
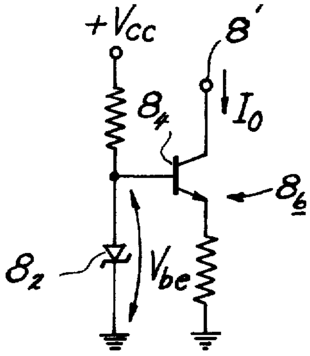
FIGS. 6A,6B,6C,6D and 6E are circuit diagrams illustrating various constant current circuits that can be employed in synchronizing signal separating circuits in accordance with this invention.
Figure 6B:
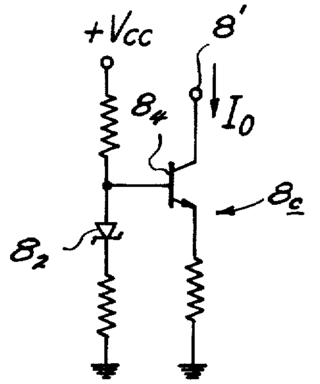
Figure 6C:
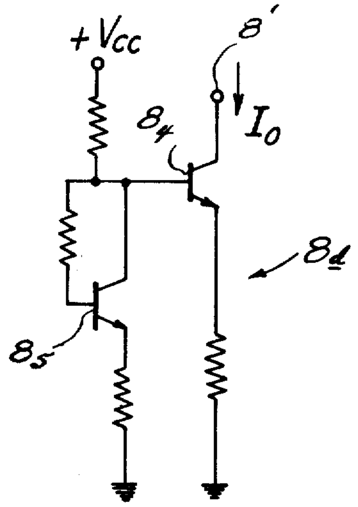
Figure 6D:
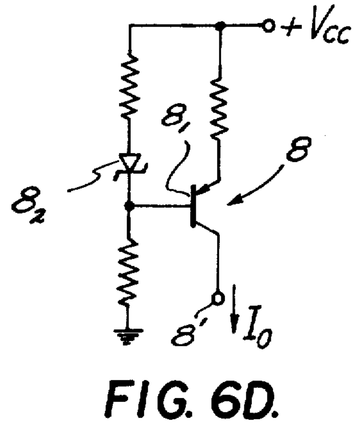
Figure 6E:
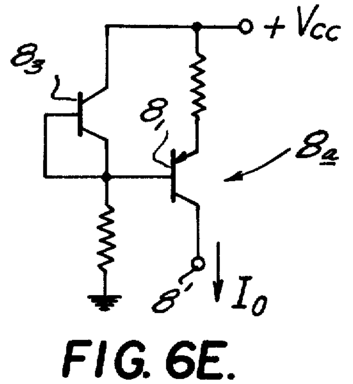

The constant current circuit 8 for providing a constant current flow in the direction of the arrow $I_o$ on FIG. 4 may have any one of various conventional configurations, for example, as identified generally at 8*b*,8*c* and 8*d* on FIGS. 6A, 6B and 6C, respectively, in which an NPN-transistor $8_4$ has either a Zener diode $8_2$ (FIGS. 6A and 6B) or an additional NPN transistor $8_5$ (FIG. 6C) connected therewith so as to maintain a constant bias voltage for the transistor $8_4$.

With the synchronizing signal separating circuit of FIG. 4, during the period of each synchronizing signal of negative polarity in the composite video signal applied to input terminal 1, the emitter potential of transistor 5 is made lower than the base potential established by source 9 so that transistor 5 becomes conductive and a corresponding synchronizing signal pulse is obtained at output terminal 7. During the period of each video information signal in the composite signal, the capacitor 2 is discharged by means of the constant current flowing in circuit 8 so that, as in the previously described embodiment of FIG. 2, a uniform charge is present on capacitor 2 at the commencement of each synchronizing signal period to avoid pulse-width-modulation of the synchronizing signal pulses obtained at the output 7 irrespective of the average voltage or amplitude of the successive video information signals.

Figure 5:
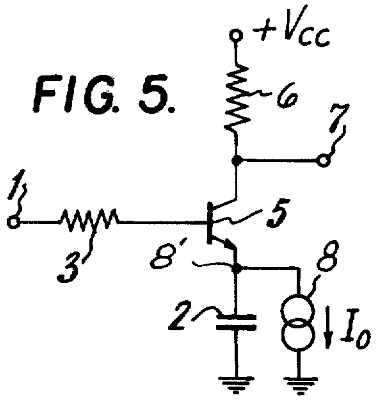

Referring now to FIG. 5, it will be understood that the embodiment of the invention there illustrated is intended for use with a composite signal having synchronizing signals of positive polarity which is supplied to the input terminal 1 and applied therefrom to the base of transistor 5 through a resistor 3, and further that transistor 5 is provided with a self-emitter biasing circuit. Thus, as shown, the capacitor 2 is connected between the emitter of transistor 5 and a reference potential, such as, ground, and the constant current circuit 8 is connected between the emitter, as at 8', and the reference potential and is arranged to transmit the constant current in the direction from the connection point or junction 8' to the reference potential, for example, as in the circuits illustrated on FIGS. 6A,6B and 6C.

With the circuit arrangement shown on FIG. 5, the capacitor 2 of the self-biasing circuit is initially charged up to the synchronizing signal clipping level so that the transistor 5 will be made conductive only during each synchronizing signal period. During each video information signal period, capacitor 2 is discharged by a constant discharging current flowing in constant current circuit 8 so that the rate of discharge of capacitor 2 is not influenced by the average voltage of the video information signal. Thus, in the circuit of FIG. 5, as in the previously described embodiments of this invention, the resulting synchronizing signal pulses obtained at the output 7 are not pulse-width modulated by the successive video information signals.

Figure 7:
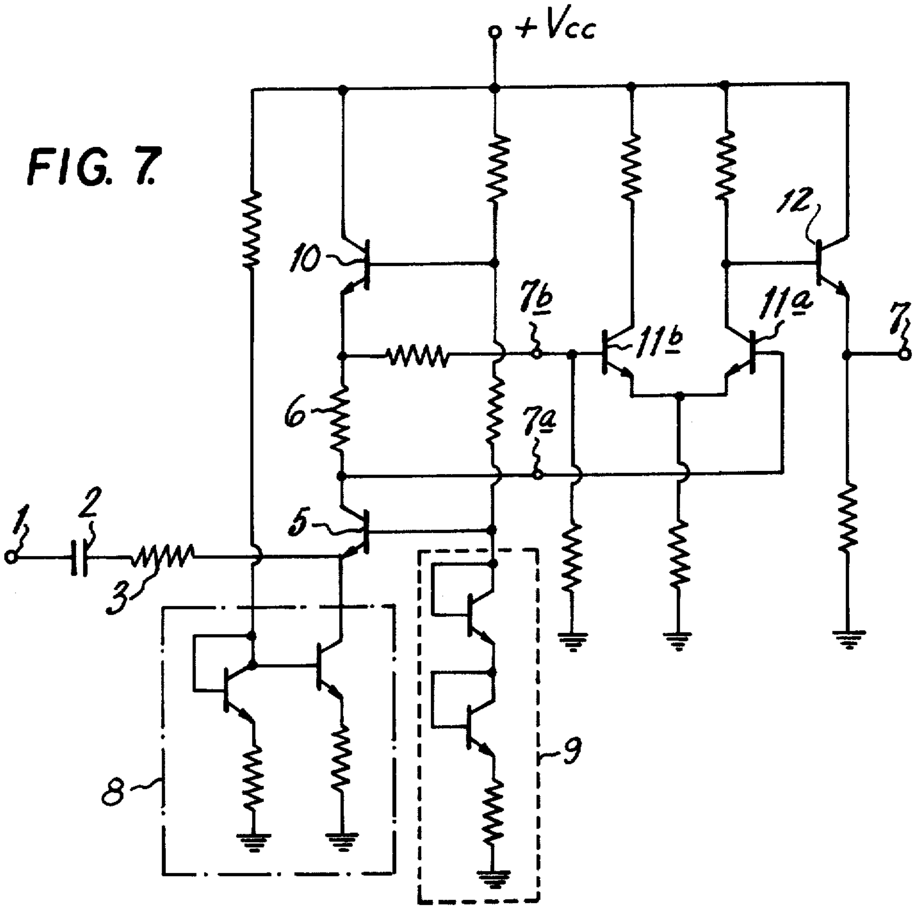
FIG. 7 is a detail circuit diagram of a complete synchronizing signal separating circuit according to the present invention, and which is of the type illustrated on FIG. 4.

Referring now to FIG. 7, it will be seen that the synchronizing signal separating circuit in accordance with this invention, as there illustrated, is generally of the type shown on FIG. 4, but with the various components thereof being shown in greater detail and constituted so as to be conveniently fabricated to the form of an integrated circuit device. In the embodiment of FIG. 7, the collector of transistor 5 is connected to the voltage supply source $+V_{cc}$ through the load resistor 6 and a bias regulating transistor 10. A pair of terminals 7*a* and 7*b* are connected with the opposite ends of resistor 6 and are respectively coupled to the bases of transistors 11*a* and 11*b* which constitute a differential amplifier. The desired synchronizing signal pulses are obtained at the output terminal 7 from the collector of transistor 11*a* through an emitter follower amplifier that includes a transistor 12. It will be noted that the constant current circuit 8 on FIG. 7 is composed of a pair of NPN-transistors arranged substantially in the manner illustrated on FIG. 6C, and that the potential source 9 is also constituted by a pair of NPN-transistors. Thus, all of the transistors included in the circuit of FIG. 7 are of a single type, that is, of the NPN-type, for facilitating the production of that circuit as an integrated circuit device.

By reason of the inclusion of the bias regulating transistor 10, the resistor 6 may be selected to have a very low value, but it will be understood that such bias regulating transistor can be omitted. Further, it will be apparent that the circuit of FIG. 7 operates in the same manner as the circuit described above with reference to FIG. 4 so as to obtain synchronizing signal pulses of uniform pulse-width.

Although illustrative embodiments of the invention have been described in detail above with reference to the accompanying drawings, it is to be understood that the invention is not limited to those precise embodiments, and that various changes and modifications may be effected therein by one skilled in the art without departing from the scope or spirit of the invention.

What is claimed is:

1. A circuit for separating synchronizing signals from a composite signal which further includes information signals interposed between successive synchronizing signals, comprising an amplifying transistor receiving said composite signal, self-biasing means including a capacitor for applying a self-bias to said amplifying transistor in response to said composite signal so that said amplifying transistor is rendered conductive only upon said synchronizing signals in said composite signal, constant current circuit means connected with said self-biasing means for maintaining said self-bias at a substantially constant value at the conclusion of each of said information signals irrespective of the value of the latter, a load resistor connected to said amplifying transistor, means for supplying an operating voltage to said amplifying transistor through said load resistor, bias regulating means connected in series with said load resistor and differential amplifier means having a first input coupled to said load resistor and a second input coupled to said bias regulating means for deriving at the output of said differential amplifier means separated synchronizing signal pulses in correspondence with said synchronizing signal in the received composite signal.

2. A circuit in accordance with claim 1 wherein said bias regulating means comprises a regulating transistor having its collector-emitter junction connected in series with said load resistor and further comprising a source of constant potential and means for coupling said source of constant potential to the base electrode of said regulating transistor.

3. A circuit in accordance with claim 2 wherein said self-biasing means is coupled to the emitter electrode of said amplifying transistor, said constant current circuit means is connected to said emitter electrode of said amplifying transistor and said source of constant potential is additionally connected to the base electrode of said amplifying transistor.

4. A circuit in accordance with claim 3 wherein said constant current circuit means comprises a first transistor having its collector-emitter junction connected in series between said emitter electrode of said amplifying transistor and a reference potential, and a second transistor connected to the base electrode of said first transistor and disposed in diode-connected configuration and being further supplied with an operating voltage.

5. A circuit in accordance with claim 4 wherein said source of constant potential comprises a series circuit formed of plural diode-connected transistors.

* * * * *